United States Patent [19]

Kitago et al.

[11] 3,998,689
[45] Dec. 21, 1976

[54] PROCESS FOR THE PRODUCTION OF CARBON FIBER PAPER

[75] Inventors: Teruaki Kitago; Tadaaki Yoshida, both of Iwaki, Japan

[73] Assignees: Kureha Kagaku Kogyo Kabushiki Kaisha, Tokyo; Toyo Boseki Kabushiki Kaisha, Osaka, both of Japan

[22] Filed: July 3, 1974

[21] Appl. No.: 485,606

[30] Foreign Application Priority Data

July 10, 1973 Japan .............................. 48-77729

[52] U.S. Cl. ............................... 162/136; 162/145; 162/146; 162/168 R; 162/175; 162/207; 427/227; 427/228

[51] Int. Cl.$^2$ .......................................... D21H 1/48

[58] Field of Search ............... 162/138, 146, 157 R, 162/168, 207, 136, 175, 145; 117/155 UA, 158; 427/227, 228

[56] References Cited

UNITED STATES PATENTS

| | | | |
|---|---|---|---|
| 3,265,557 | 8/1966 | De Fries et al. .................. | 162/146 |
| 3,367,851 | 2/1968 | Filreis et al. ........................ | 204/2 |
| 3,539,296 | 11/1970 | Selke ............................... | 23/209.4 |
| 3,628,985 | 1/1971 | Hider et al. ....................... | 427/228 |
| 3,671,385 | 6/1972 | Trent et al. ..................... | 162/157 R |
| 3,674,621 | 7/1972 | Miyamoto et al. ............. | 162/157 R |
| 3,682,595 | 8/1972 | Okuda et al. ...................... | 427/228 |
| 3,774,299 | 11/1973 | Sato et al. ............................ | 29/611 |
| 3,829,327 | 8/1974 | Omori et al. ....................... | 117/126 |
| 3,855,056 | 12/1974 | Maeda ................................ | 162/146 |
| 3,891,499 | 6/1975 | Kato et al. ...................... | 162/157 R |

*Primary Examiner*—Robert L. Lindsay, Jr.
*Assistant Examiner*—William F. Smith
*Attorney, Agent, or Firm*—Lane, Aitken, Dunner & Ziems

[57] ABSTRACT

A carbon fiber paper is obtained from a mixture of carbon fibers, pulp, organic fibers having a carbon yield of not less than 20% and a paper sheet binder in relative amounts such that the ratio of the carbon fibers to the pulp falls in the range of 40 – 90% by weight of carbon fibers to 60 – 10% by weight of pulp, the ratio of the organic fibers to the combined weight of said carbon fibers and pulp falls in the range of from 5 to 20% by weight and the ratio of the paper sheet binder to the combined weight of said carbon fibers, pulp and organic fibers falls in the range of from 5 to 50% by weight. The resultant mixture is shaped into the form of sheet to produce a mixed paper sheet, impregnated with an organic high molecular substance and baked to carbonize at a temperature of not less than 800° C in an atmosphere of an inert gas.

8 Claims, No Drawings

PROCESS FOR THE PRODUCTION OF CARBON FIBER PAPER

FIELD OF THE INVENTION

This invention relates to a process for the production of a carbon fiber paper having excellent resistance to corrosion, good electroconductivity and high mechanical strength.

BACKGROUND OF THE INVENTION

Composite paper sheets produced by mixing carbon fibers with polyvinyl alcohol fibers or pulp and shaping the resultant mixture in the form of sheet are known as carbon fiber paper and have been used as electroconductive elements, for example. Such carbon fiber sheet, however, has a relatively high electric resistance and is deficient in mechanical strength. Further, the pulp or polyvinyl alcohol fibers have low resistance to heat and corrosion. Thus, the carbon fiber paper sheet fails to function satisfactorily when it is used as a base sheet for electrodes in fuel batteries, for example. In order to impart desirable properties such as high electroconductivity and mechanical strength to carbon fiber paper, attempts have been made to join and immobilize points of mutual contact of the individual carbon fibers in the paper by impregnating the mixed paper sheet prepared as described above with a solution having a phenol resin dissolved in such solvent as methanol. The impregnated mixed paper sheet is then heated to a temperature of not less than 800° C within an atmosphere of an inert gas. In all of these methods, the carbon fiber paper thus produced still to acquire properties suitable for use as an electroconductive element.

Thus, there exists a need for provision of a carbon fiber paper which has high electroconductivity, mechanical strength and resistance to corrosion.

SUMMARY OF THE INVENTION

Therefore, it is an object of this invention to provide a carbon fiber paper which has high electroconductivity and excellent resistance to corrosion and, at the same time, possesses high density and consequently high mechanical strength.

Another object of the present invention is to provide a carbon fiber paper highly suitable for use as an electroconductive element.

Other objects of this invention will become apparent from the following description of the invention. It has been discovered that an improved carbon fiber paper can be obtained by mixing carbon fibers, pulp, a specified type of organic fibers and a paper sheet binder in specific proportions, shaping the resultant mixture into the form of sheet, impregnating the mixed paper sheet with an organic high molecular weight substance and subsequently carbonizing the impregnated mixed paper sheet. The present invention relies on the use of organic fibers having a high carbon yield. The present invention starts with a mixture of carbon fibers, pulp, organic fibers having a carbon yield of not less than 20% and a paper sheet binder in relative amounts such that the ratio of the carbon fibers to the pulp falls in the range of 40 – 90% by weight of carbon fibers to 60 – 10% by weight of pulp, the ratio of the organic fibers to the combined weight of carbon fibers and pulp falls in the range of from 5 to 20% by weight and the ratio of the paper sheet binder to the combined weight of carbon fibers, pulp and organic fibers falls in the range of from 5 to 50% by weight. The resultant mixture is then shaped into the form of a sheet, impregnated with an organic high molecular substance and thereafter baked to carbonize the impregnated sheet at a temperature of not less than 800° C in an atmosphere of an inert gas.

DETAILED DESCRIPTION OF THE INVENTION

The type of carbon fibers used as the starting material for the present invention is not critical. Carbon fibers of any kind will suffice. They are generally produced from raw materials such as pitch, polyacrylonitrile, cellulose and lignin. The pulp to be used for the present invention is also the general run of pulp and is not critical.

For use in the present invention, the organic fibers are only required to have a carbon yield of not less than 20%. Examples of such organic fibers include acrylonitrile-based synthetic fibers, cellulosic fibers, phenol-based synthetic fibers and polyimide fibers. The term "carbon yield" as used herein means the yield from baking the fibers at a temperature of not less than 800° C in an atmosphere of an inert gas.

Further, the paper sheet binder used for this invention is again an ordinary paper sheet binder and is not critical. Examples of suitable paper sheet binders are polyvinyl alcohol fiber and Hibiscus manihot.

In the present invention, the aforementioned carbon fibers, pulp, organic fibers and paper sheet binder are first mixed and the mixture is then shaped in the form of sheet to produce a mixed paper sheet. It is essential that the four ingredients should be mixed in relative amounts such that the ratio of the carbon fibers to the pulp falls in the range of 40 – 90% by weight of carbon fibers to 60 – 10% by weight of pulp, the ratio of the organic fibers to the combined weight of carbon fibers and pulp falls in the range of from 5 to 20% by weight and the ratio of the paper sheet binder to the combined weight of carbon fibers, pulp and organic fibers falls in the range of from 5 to 50% by weight. If these ingredients are used in amounts falling outside the respective ratios, then a desirable carbon fiber paper is not obtained. Particularly if the carbon fibers are used in an amount not exceeding 40% by weight with respect to the ratio of carbon fibers to pulp, then the resultant mixed paper sheet will have an excessive pulp content and, as a consequence, the thermal shrinkage which occurs during carbonization will produce numerous wrinkles on the surface of the carbon fiber paper product and also lead to a reduction in the mechanical strength of the product. On the other hand, if the carbon fibers are used in an amount exceeding 90% by weight, then the carbon fiber paper will not have the desired high bulk density. When organic fibers having a carbonaceous yield of not less than 20% are added, they remain in the proper product in the form of a fibrous carbonaceous binder and, during carbonization, strengthen the mutual adhesion of individual carbon fibers and at the same time heighten the compaction density. Consequently, the addition of such organic fibers is effective in enhancing both mechanical strength and electroconductivity of the carbon fiber paper product. With regard to the amount of organic fibers to be used, if the organic fibers are added in an amount not exceeding 5% by weight based on the combined weight of carbon fibers and pulp, then no discernible effect on the mechanical strength and electroconductivity results as compared with the case excluding their addition. If they are added in an amount exceeding 20% by weight, however, there exists the possibility that the carbon fiber paper will have warps or show insufficient flexibility and undersirable brittleness.

In shaping the mixture of the aforementioned four ingredients in the form of sheet, the sheet forming can be accomplished by a conventional paper-making operation. The carbon fibers and the organic fibers should both be in the form of short fibers measuring from 1 to 10 mm in length. Thus the present invention provides a mixed paper sheet wherein the carbon fibers, pulp and organic fibers are joined to one another by the paper sheet binder.

The mixed paper sheet thus obtained is impregnated with an organic high molecular substance. The organic high molecular substances which are suitable for this purpose include thermosetting resins such as phenol resins, epoxy resins, unsaturated polyester resins and polydivinylbenzene, thermoplastic resins such as vinyl chloride resins, vinylidene chloride resins, vinylidene fluoride resins and acrylonitrile resins and bituminous substances such as pitch and tar. In impregnating the mixed paper sheet, the desired impregnation may be accomplished by immersing the mixed paper sheet in a solution or dispersion obtained by dissolving or dispersing the high molecular weight substance. On carbonization, the adsorbed organic high molecular substance converts into a carbonaceous binder. The portion of the organic high molecular substance which has been deposited and carbonized on the surface of the organic fibers is converted into a fibrous carbonaceous binder and serves to join carbon fibers and acquires a rugged surface. This rugged-surfaced binder functions to stabilize both the strength and electroconductivity of the finally produced carbon fiber paper. In carrying out the impregnation, therefore, if the amount of said organic high molecular substance caused to adhere to said mixed paper sheet is too small, the desired binding effect will not be achieved. If it is excessive, the substance will cause a phenomenon known as clogging on the finally produced carbon fiber paper and thereby embrittle the paper. It is therefore important that due attention be paid to the selection of the amount of organic high molecular substance allowed to adhere to the mixed paper sheet. The results of tests indicate that it is desirable to immerse the mixed paper sheet in a solution or dispersion containing the organic high molecular substance in an amount of from 1 to 30% by weight so as to allow the organic high molecular substance to adhere to the mixed paper sheet in an amount of from 5 to 50% by weight based on the weight of the mixed paper sheet.

The mixed paper sheet which has been thus impregnated with the organic high molecular substance is then baked at a temperature of not less than 800° C in an atmosphere of an inert gas so as to be carbonized into a carbon fiber paper. The mixed paper sheet impregnated with an organic high molecular substance may be infusibilized in advance of carbonization, where necessary, by a conditioning process such as oxidation or chemical treatment. The infusibilizing treatment serves to prevent the bituminous substance and thermoplastic resins having low melting points from melting and flowing out of position in the course of the baking process.

When the baking of the mixed paper sheet is carried out in this way, the organic fibers and the organic high molecular substance contained in the mixed paper sheet are simultaneously carbonized and condensed, thus strongly joining and immobilizing the individual carbon fibers at their points of contact. The result is a structure wherein the individual carbon fibers are joined to one another by the carbonaceous binder. In contrast, in a conventional process, carbon fiber paper is prepared, for example, by mixing carbon fibers with polyvinyl alcohol fibers, shaping the resultant mixture in the form of sheet with the aid of an ordinary sheet-making machine, impregnating the sheet with a solution of high molecular weight substance such as phenol resin similar to that which is used in the present invention and thereafter baking the impregnated sheet at a temperature of not less than 800° C in an inert atmosphere. The superiority of the product of the present invention as compared to similar prior art products is believed to be due to the fact that the individual carbon fibers are strongly joined and immobilized at points of their mutual contact.

The carbon fiber paper according to the present invention finds utility as an electroconductive element and may be used as a base material for electrodes in fuel batteries and electric dust collectors, as a heat-generating element in panel heaters and as a lining material in corrosion-proof containers. The carbon fiber paper provided by this invention is particularly suited for use as a base material for electrodes in fuel batteries. To be more exact, this carbon fiber paper is resistant to corrosion by the corrosive solution of electrolyte, serves to keep the position of contact between the fuel gas and the solution of electrolyte stably within the plane in which the catalyst is retained and possesses a gas permeability suitable for effecting ready exchange between the unaltered gas and the reacted gas at this fixed position.

The present invention will be explained more specifically with reference to preferred embodiments described. In the preferred embodiments, the terms "parts" and "percents" used therein mean parts by weight and percents by weight respectively.

EXAMPLE 1

Mixed paper sheets 50, 100 and 150 g/m² in unit sheet weight were produced by processing, with a Yankee type fourdrinier machine, a paper stock prepared by dispersing in water 80 parts of carbon fibers 3 mm in fiber length, 20 parts of pulp, 20 parts of regenerated cellulose 6 mm in fiber length and having a carbonaceous yield of 25% and 10 parts of polyvinyl alcohol. These mixed paper sheets were impregnated with a solution containing 4% of a phenol resin (AP-3104 made by Gunei Chemical) dissolved (as an organic high molecular substance) in methyl alcohol as a dilluent to deposit 17% resin based on the weight of mixed paper sheet), dried at a temperature of about 100° C and baked at a temperature of 1000° C in a furnace maintained in an atmosphere of an inert gas to produce carbon fiber papers in which the individual carbon fibers were joined to one another with a carbonaceous binder. The physical properties of these carbon fiber papers were as shown in Table 1.

TABLE 1

| Unit sheet weight (g/m²) | Unit sheet weight after heat treatment (g/m²) | Thickness (mm) | Bulk density (g/cm³) | Resistance* (Ω) Machine direction | Resistance* (Ω) Trans-direction | Mach./Trans.ratio |
|---|---|---|---|---|---|---|
| 50 | 40 | 0.266 | 0.150 | 5.00 | 10.05 | 2.01 |
| 100 | 80 | 0.553 | 0.145 | 2.72 | 5.09 | 1.87 |
| 150 | 120 | 0.829 | 0.156 | 1.77 | 3.09 | 1.73 |
| 40 (Conventional countertype) | 40 | 0.300 | 0.133 | 6.26 | 19.89 | 3.18 |

*Test pieces for measurement of resistance — 200 mm × 200 mm (excluding 20 mm of electrode portion)

It is clear from Table 1 that the products of this invention have lower electrical resistance and generally better properties than the conventional counterpart. Further, the data indicate that they are less of anisotropic with respect to resistance which is quite conspicuous in the conventional counterpart. The products of the present invention made from a mixture containing not less than 20% of organic fibers are superior to the conventional products in this respect.

EXAMPLE 2

The same mixed fiber papers as obtained in Example 1 were similarly impregnated so as to have the phenol resin deposited in the varying amounts of 17, 27 and 37% and baked at a temperature of 2000° C in an atmosphere of an inert gas to produce carbon fiber papers in which the individual carbon fibers were joined to one another with a carbonaceous binder. The physical properties of these products were as shown in Table 2.

TABLE 2

| Unit sheet weight (g/m²) | Amount of phenol resin deposited (%) | Unit sheet weight after heat treatment (g/m²) | Thickness (mm) | Resistance (Ω)*¹ Machine direction | Resistance (Ω)*¹ Trans-direction | Tensile strength*² (kg/50 mm) Machine direction | Tensile strength*² (kg/50 mm) Trans-direction |
|---|---|---|---|---|---|---|---|
| 50 | 17 | 38.0 | 0.280 | 1.93 | 3.93 | 5.16 | 1.88 |
| 50 | 27 | 46.0 | 0.263 | 1.31 | 2.91 | 8.43 | 3.17 |
| 50 | 37 | 47.0 | 0.269 | 1.26 | 2.16 | 8.90 | 3.40 |
| 100 | 17 | 78.0 | 0.582 | 1.06 | 1.96 | 6.87 | 3.47 |
| 100 | 27 | 85.0 | 0.522 | 0.81 | 1.30 | 11.81 | 5.63 |
| 100 | 37 | 96.0 | 0.494 | 0.67 | 0.99 | 13.98 | 7.67 |
| 150 | 17 | 120.0 | 0.800 | 0.71 | 1.06 | 6.91 | 6.60 |
| 150 | 27 | 137.0 | 0.762 | 0.51 | 0.69 | 17.22 | 11.15 |
| 150 | 37 | 150.0 | 0.747 | 0.46 | 0.65 | 19.41 | 11.46 |
| 40 (conventional countertype) | 17 | 40.0 | 0.303 | 2.14 | 6.25 | 3.92 | 1.35 |

*¹Test pieces for measurement of resistance — 200mm × 200mm (excluding 20mm of electrode portion)
**Tensile strength — Test piece 50 mm in width × 120 mm in length
Testing length : 80 mm
Instrument : Instron tester
Stretching rate: 10 mm/min

EXAMPLE 3

Mixed paper sheets 90 g/m² in unit sheet weight were prepared by processing, with an ordinary sheet-making machine, a paper stock obtained by adding to water a mixture consisting of 40 parts of carbon fibers 6 mm in fiber length, 60 parts of pulp, 10 parts of regenerated cellulose fibers 6 mm in fiber length and 25% in carbonaceous yield and 10 parts of polyvinyl alcohol. The mixed paper sheets were impregnated with an inpregnating liquid prepared by dissolving 4% of resinous pitch (a by-product from the cracking of crude oil) in acetone (to deposit 15% by weight), dried and thereafter exposed to an oxidizing atmosphere to infusibilize the resinous pitch and baked at temperatures of 1000° and 2000° C in an atmosphere of an inert gas to produce carbon fiber papers in which the individual carbon fibers were joined to one another with a carbonaceous binder. The physical properties of these carbon fiber papers were as shown in Table 3.

TABLE 3

| Temperature of heat treatment (° C) | Unit weight after heat treatment (g/m²) | Thickness (mm) | Bulk density (g/cm³) | Resistance* (Ω) Machine direction | Resistance* (Ω) Trans-direction |
|---|---|---|---|---|---|
| 1000 | 45.0 | 0.205 | 0.221 | 4.06 | 10.22 |
| 2000 | 41.0 | 0.204 | 0.201 | 1.44 | 2.90 |

*Test pieces for measurement of resistance — Same as in Example 1.

EXAMPLE 4

A mixture consisting of 80 parts of carbon fibers 6 mm in fiber length, 20 parts of pulp, 20 parts of polyacrylonitrile fibers 6 mm in fiber length and 38% in carbonaceous yield and 10 parts of polyvinyl alcohol was added to water to produce a paper stock. This paper stock was processed with a conventional sheet-making machine to form mixed paper sheets 50 g/m² in unit sheet weight. These mixed paper sheets were impregnated with a latex containing 5% of polyvinyl chloride-polyvinylidene chloride copolymer (to deposit 20% resin), dried and thereafter baked at temperatures of 1000° and 2000° C. Consequently, there were obtained carbon fiber sheets in which the individual carbon fibers were joined to one another. These sheets had similar physical properties to those of the products of the preceding example. The physical properties were as shown in Table 4.

TABLE 4

| Temperature of heat treatment (° C) | Unit weight after heat treatment (g/m²) | Thickness (mm) | Bulk density (g/cm³) | Resistance (Ω)* | |
|---|---|---|---|---|---|
| | | | | Machine direction | Trans- direction |
| 1000 | 40.0 | 0.275 | 0.146 | 4.33 | 10.87 |
| 2000 | 38.0 | 0.255 | 0.149 | 1.47 | 2.99 |

*Test pieces for measurement of resistance — Same as in Example 1.

What is claimed is:

1. A process for the production of a carbon fiber paper, comprising:
    mixing, in a liquid medium to form a slurry, carbon fibers, pulp, organic fibers having a carbonaceous yield of not less than 20% and a paper sheet binder in relative amounts such that the ratio of the carbon fibers to the pulp falls in the range of 40–90% by weight of carbon fibers to 60–10% by weight of pulp, the ratio of the organic fibers to the combined weight of said carbon fibers and pulp falls in the range of from 5 to 20% by weight and the ratio of the paper sheet binder to the combined weight of said carbon fibers, pulp and organic fibers falls in the range of from 5 to 50% by weight;
    shaping the resultant mixture into the form of sheet to produce a mixed sheet;
    impregnating the mixed fiber sheet with an organic high molecular weight substance; and then
    baking the impregnated sheet at a temperature of not less than 800° C. in atmosphere of an inert gas to carbonize the sheet.

2. The process of claim 1, wherein said organic fibers are selected from acrylonitrile-based synthetic fibers, cellulosic fibers, phenol-based synthetic fibers and polyimide fibers.

3. The process of claim 1, wherein said organic high molecular substance is a member selected from thermosetting resins, thermoplastic resins and bituminous substances.

4. The process of claim 3, wherein said thermosetting resin is a member selected from phenolic resins, epoxy resins, unsaturated polyester resins and polydivinyl benzene.

5. The process of claim 3, wherein said thermoplastic resin is a resin selected from vinyl chloride resins, vinylidene chloride resins, vinylidene fluoride resins and acrylonitrile resins.

6. The process of claim 3, wherein said bituminous substance is pitch or tar.

7. The process of claim 1, wherein the mixed fiber sheet is impregnated with said organic high molecular substance by immersing said mixed fiber sheet in a solution containing 1 to 30% by weight of said organic high molecular substance so as to effect an organic, high molecular substance content in said mixed fiber of about 5 to 50% by weight, based on the weight of said mixed fiber sheet.

8. The process of claim 1, wherein said mixed fiber sheet is impregnated with said organic high molecular substance by immersing said mixed fiber sheet in a dispersion containing 1 to 30% by weight of said organic high molecular substance so as to effect an organic high molecular weight substance content in said mixed fiber sheet of about 5 to 50% by weight, based on the weight of said mixed fiber sheet.

* * * * *